United States Patent [19]
Lindsay

[11] Patent Number: 6,152,638
[45] Date of Patent: Nov. 28, 2000

[54] EXTENDABLE LEGS FOR STANDS OR SIMILAR APPLIANCES

[75] Inventor: Richard Arthur Lindsay, Eye, United Kingdom

[73] Assignee: Vitec Group, PLC, Suffolk, United Kingdom

[21] Appl. No.: 09/171,872

[22] PCT Filed: Jan. 24, 1997

[86] PCT No.: PCT/GB97/00227

§ 371 Date: Mar. 4, 1999

§ 102(e) Date: Mar. 4, 1999

[87] PCT Pub. No.: WO97/41383

PCT Pub. Date: Nov. 6, 1997

[30] Foreign Application Priority Data

Apr. 29, 1996 [GB] United Kingdom .................... 9608945

[51] Int. Cl.$^7$ ....................................................... F16B 7/10
[52] U.S. Cl. ................................. 403/109.5; 403/109.3; 403/104
[58] Field of Search ................................. 403/109.1, 109.2, 403/109.3, 109.5, 109.7, 377, 104; 248/407, 408, 412

[56] References Cited

U.S. PATENT DOCUMENTS

| | | | |
|---|---|---|---|
| 2,455,525 | 12/1948 | Schulz | 403/104 X |
| 2,600,735 | 6/1952 | Corneliussen et al. | 403/104 |
| 4,029,279 | 6/1977 | Nakatani | 403/109.5 X |
| 4,174,900 | 11/1979 | Ina | 403/109.5 X |
| 4,362,415 | 12/1982 | Metz et al. | 403/109.3 |
| 4,793,197 | 12/1988 | Petrovsky | 403/109.7 |
| 5,492,430 | 2/1996 | Jones . | |
| 5,593,239 | 1/1997 | Sallee | 403/109.3 |
| 5,660,495 | 8/1997 | Atsukawa | 403/377 |

FOREIGN PATENT DOCUMENTS

| | | |
|---|---|---|
| 0 063 783 | 11/1982 | European Pat. Off. . |
| 1 260 368 | 1/1992 | United Kingdom . |

*Primary Examiner*—Lynne H. Browne
*Assistant Examiner*—David E. Bochna
*Attorney, Agent, or Firm*—Kenyon & Kenyon

[57] ABSTRACT

An extendable leg for a stand or similar appliance having elongate members (13,14,15) interconnected to extend and retract with respect to each other includes a first member (13), intermediate member (14) and a final member (15). The intermediate and final members have releasable locking devices (16,17,18) adjacent to one end of the leg engagable with the first and intermediate members respectively. Remote release devices (19) are provided for releasing the locking devices from the other end of the leg to permit when released, the first member to the extended with respect to the intermediate member and the intermediate member to be extended with respect to the final member. A further locking device (20,22,24) is provided between the intermediate and final members and is arranged to be released automatically on full extension of said first member with respect to the intermediate member to release the intermediate member for extension with respect to the final member for full extension of the leg and to re-engage automatically on completion of retraction of the intermediate member with respect to the final member.

8 Claims, 2 Drawing Sheets

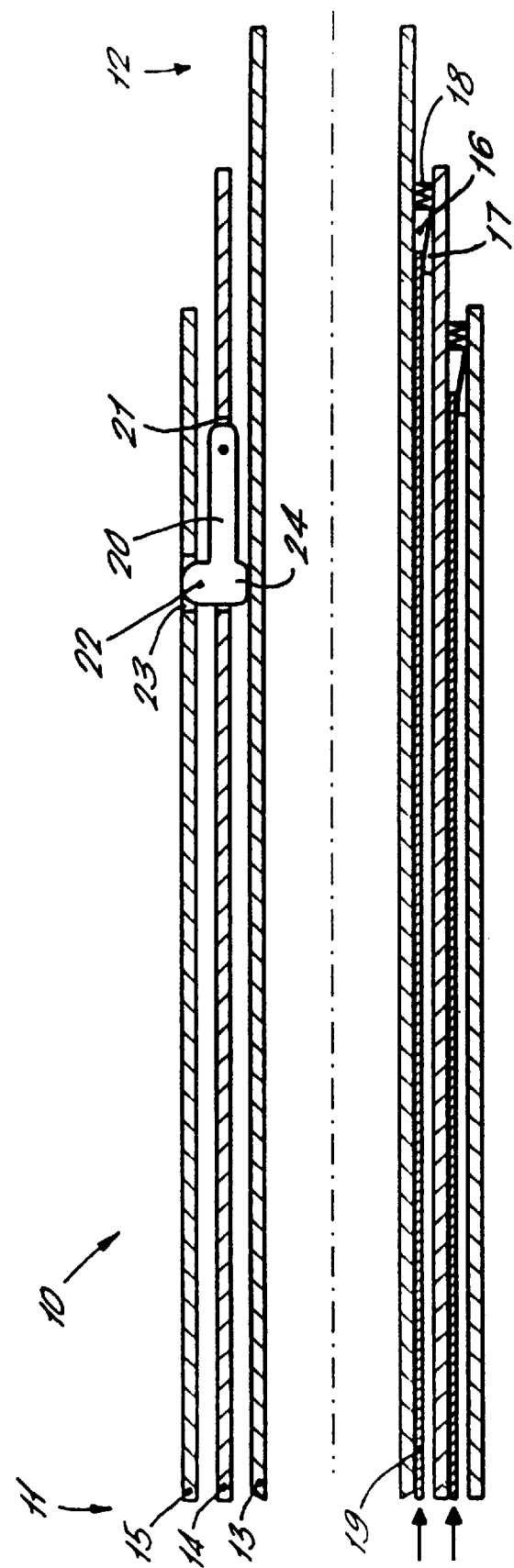

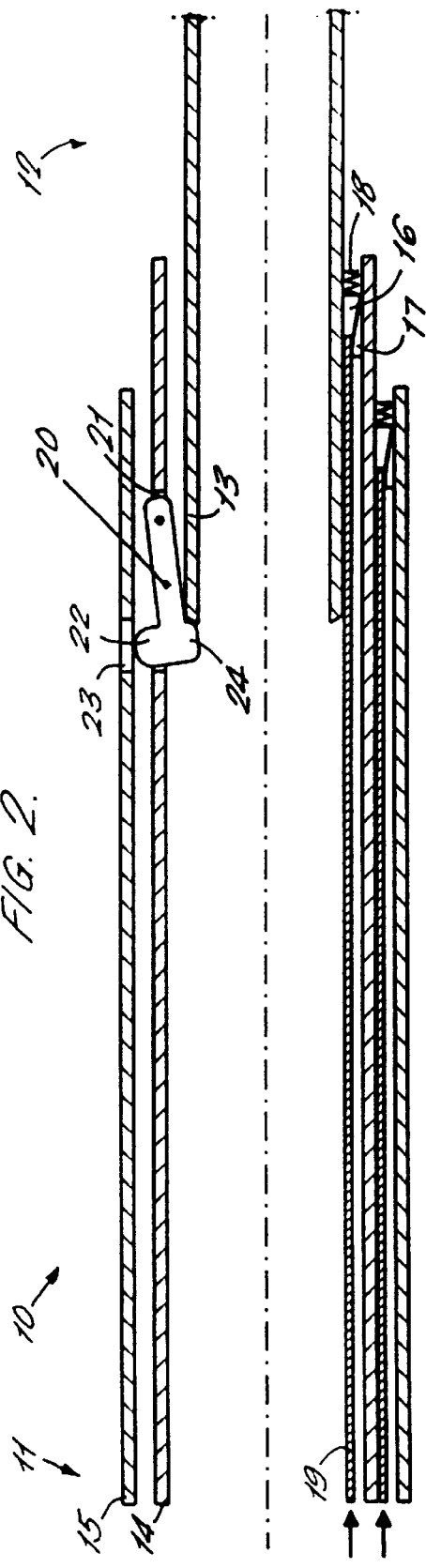
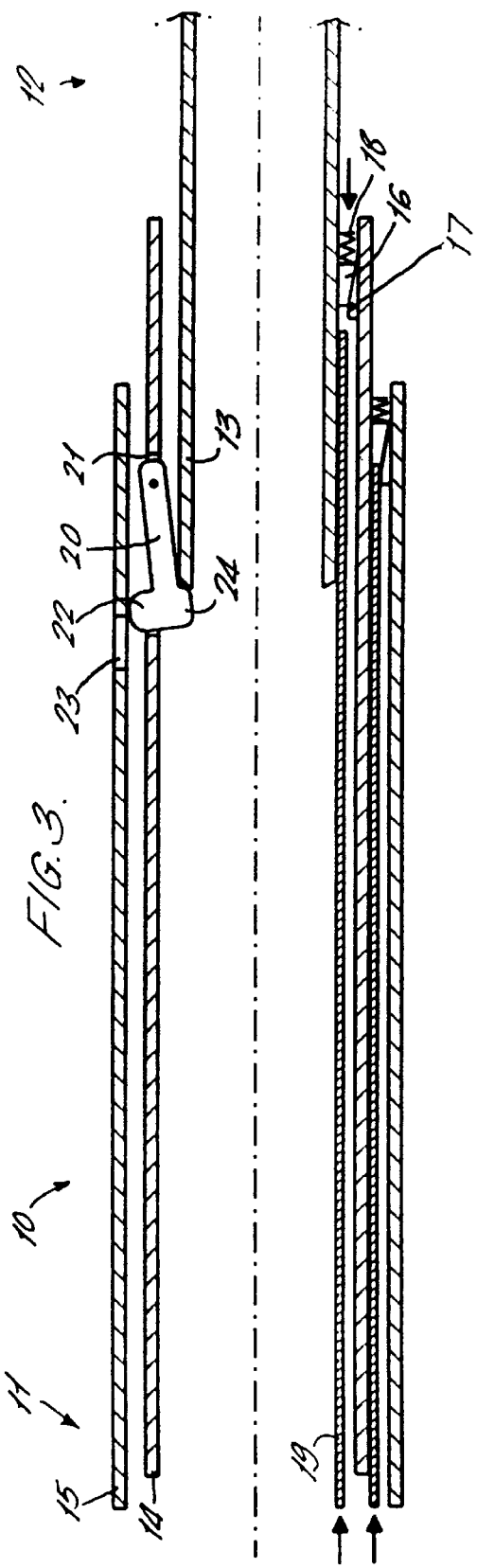

EXTENDABLE LEGS FOR STANDS OR SIMILAR APPLIANCES

This invention relates to an extendable leg for a stand or similar appliance and is particularly although not exclusively applicable to a stand in the form of a tripod for mounting a camera or similar optical equipment.

A number of different forms of extendable leg are known for camera tripods and the like. Such legs have a plurality of extensions, each one locked and released by separate controls at spaced locations down the leg. This is inconvenient since each extension of each leg has to be re-locked separately which can be difficult for the camera operator to do, particularly in the case of a relatively heavy camera.

GB-A-1260368 discloses a leg for a photographic stand which is adjustable in length, the leg having a lower tubular member mounted for axial movement within an upper, outer tubular member to vary the length of the leg. A clamping device holds the lower member in a variety of desired positions along the leg axis, the clamping device being released from an upper part of the stand via a push-rod extending between the tubular members.

The object of the present invention is to provide an extendible leg consisting of at least three members with an arrangement for ensuring that one member is fully extended before the next member extends and, likewise, in retraction.

This invention provides an extendable leg for a stand or similar appliance having a plurality of elongate members interconnected to extend and retract with respect to each other including a first member at least one intermediate member and a final member, the intermediate member have a first releasable locking device adjacent to one end of the leg engagable with the first member and remote release means for releasing the first locking device from the other end of the leg to permit, when released, the first member to extend with respect to the intermediate member; wherein the final member has a second releasable locking device adjacent to said in one end of the leg engagable with the intermediate member and remote release means for releasing the second locking device from said other end of the leg; and in that additional locking means are provided between the intermediate and final members arranged to be released automatically on full extension of the first member with respect to the intermediate member to release the intermediate member for full extension with respect to the final member for full extension of the leg and to re-engage automatically on completion of retraction of the intermediate member with respect to the final member.

Preferably the locking means comprises a latch mounted on the intermediate member at a location adjacent said other end of the leg and held in locking engagement with the final member by the first member when the latter is in its retracted position and released therefrom when the first member is in its extended position.

More specifically the latch may have a projection which is engagable in an aperture in the final member to lock the intermediate member to the final member.

Furthermore, the latch may have an abutment engagable with the first member when the latter is in its retracted condition and released from the first member when the latter is in its fully extended condition to allow the latch member to disengage from the final member.

In one particular arrangement in accordance with the invention, the latch member may be pivotally mounted on the intermediate member.

Preferably the releasable locking devices may be spring biased in the locking direction and the remote release members may comprise push members extending from the other end of the leg acting on the locking devices so that when the first member is fully extended with respect to the intermediate member and the intermediate member commences to extend with respect to the final member, the locking device disengages from its push member so that the spring means acting on the locking device locks the device to the first member to lock the first and intermediate members together and so that when the intermediate member reaches its fully extended position, the push member for the locking device can be released to lock the intermediate member with respect to the final member.

In the preferred embodiment of the invention the first, intermediate and final members are telescopically interconnected sleeves, the innermost of which is the first member and the outermost of which is the final member.

In any of the above arrangements a plurality of intermediate members is provided each having a remotely operable releasable locking device at said one end of the leg and a further locking device automatically released by the preceding member to allow the intermediate member to be extended with respect to the succeeding member.

The invention may include a tripod having a mounting head and extendable legs as claimed in any of the preceding claims depending from the head.

The following is a description of a specific embodiment of the invention, reference being made to the accompanying drawings in which;

FIG. 1 is a sectional view through a multi-tube telescopic leg for a camera stand or the like showing the leg in the retracted condition;

FIG. 2 is a similar view to FIG. 1 showing the inner tube of the leg fully extended;

FIG. 3 is a similar view to FIG. 1 showing the intermediate tube partially extended; and FIG. 4 is a similar view to FIG. 1 showing a telescopic leg including several intermediate members.

Referring firstly to FIG. 1 of the drawings, there is shown a telescopic leg for a camera stand indicated generally at 10 having a head end indicated generally at 11 on which a camera mounting is supported and a foot end indicated generally at 12 to engage the ground.

The leg comprises three telescopically interconnected tubes comprising a first inner tube 13, an intermediate tube 14 and an outer tube 15.

At the foot of the leg, the intermediate tube has a locking device engagable with the inner tube 13 and comprising a pair of cooperating wedges 16, 17 spring loaded in a locking direction by a spring indicated at 18. The locking device is released by separating the wedges against the action of the spring 18 through a push member in the form of an arcuate cross section sleeve 19 extending coaxially between the first and intermediate sleeves from the head end of the leg. A similar locking device is provided at the foot end of the outer tube 15 to engage the intermediate tube and like parts have been allotted the same reference numerals.

To control the sequence in which the tubes extend, a latch 20 is pivotally mounted in a slot 21 in the intermediate tube 14 towards the foot end thereof and has an outwardly extending projection 22 which is engagable in an aperture 23 in the wall of the outer tube 15. The latch has an inwardly projecting abutment 24 which bears on the outer surface of the first tube 13 when the latter is in its retracted condition. Thus when the first tube is retracted, the projection 22 of the latch on the intermediate member prevents the intermediate member from moving axially with respect to the outer members.

Extension of the leg is effected by pressing the push members 19 from the head end of the leg to release the locking devices 16 and 17 between the intermediate member and first member and final member and intermediate member respectively. The first member 13 can then be extended with respect to the intermediate member as illustrated in FIG. 2 until the end of the first member is drawn beyond the abutment 24 of the latch 20. The abutment 24 on the latch then drops behind the end of the inner sleeve 13 extracting the projection 22 from the aperture in the outer sleeve and thereby permitting the intermediate member to extend with respect to the outer sleeve. Once the intermediate member starts to move away from the head end of the leg, the locking device 16/17 on the intermediate member disengages from the push member 19 allowing the spring 18 to lock the device between the intermediate member and first member so that the first and intermediate members then move together as can be seen in FIG. 3. The intermediate member is extended with respect to the outer member 15 as required and the push member controlling its extension is released when the required extension has been reached.

The leg is collapsed in the reverse manner by pressing the push members 19 to release the locking devices between the final and intermediate sleeve to allow the intermediate sleeve to telescope into the final sleeve re-engaging the locking device between the intermediate and first sleeve with its push member to release the locking action and allow the first sleeve to move inwardly with respect to the intermediate sleeve deflecting the latch outwardly to engage the projection 22 in the aperture 23 to lock the intermediate and final sleeves together and finally to return the first sleeve to its fully retracted starting position, as shown in FIG. 1.

As indicated previously, the telescopic leg is particularly suitable for a tripod form stand suitable for carrying a camera or other optical equipment. In that case, the head end 11 of the each leg is pivotally mounted on a camera supporting platform which is provided with a device such as a rotary cam for acting on the push members 19 for each of the legs so that operation of one member controls release and retraction of all three legs. The arrangement therefore provides a very convenient and easily operated telescopic stand for the camera operator.

What is claimed is:

1. An extendable leg for a stand or similar appliance having a plurality of elongate members interconnected to extend and retract with respect to each other, the leg including a first member, at least one intermediate member and a final member, the intermediate member having a first releasable locking device adjacent to a first end of the leg engagable with the first member and a remote release means for releasing the first locking device from a second end of the leg to permit, when released, the first member to extend with respect to the intermediate member wherein the final member has a second releasable locking device adjacent to the first end of the leg engagable with the intermediate member and a further remote release means for releasing the second locking device from the second end of the leg and wherein additional locking means are provided between the intermediate and final members arranged to be released automatically on full extension of the first member with respect to the intermediate member to release the intermediate member for full extension with respect to the final member for full extension of the leg and to re-engage automatically on completion of retraction of the intermediate member with respect to the final member.

2. An extendable leg as claimed in claim 1, wherein the additional locking means comprise a latch mounted on the intermediate member at a location adjacent the first end of the leg, the latch being held in locking engagement with the final member by the first member when the latter is in its retracted position and being released therefrom when the first member is in its extended position.

3. An extendable leg as claimed in claim 2, wherein the latch has a projection which is engagable to an aperture in the final member to lock the intermediate member to the final member.

4. An extendable leg as claimed in claim 2, wherein the latch has an abutment engagable with the first member when the latter is in its retracted condition and released from the first member when the latter is in its fully extended condition to allow the latch member to disengage from the final member.

5. An extendable leg as claimed in claim 2, wherein the latch is pivotally mounted on the intermediate member.

6. An extendable leg as claimed in claim 1, wherein the first releasable locking devices is spring biased in a locking direction and the corresponding remote release means comprises a push member extending from the second end of the leg and acting on the first releasable locking device so that, when the first member is fully extended with respect to the intermediate member and the intermediate member commences to extend with respect to the final member, the first releasable locking device disengages from its push member so that the spring bias locks the first releasable locking device to the first member to lock the first and intermediate members together and wherein, when the intermediate member reaches its fully extended position, the push member for the second locking device can be released to lock the intermediate member with respect to the final member.

7. An extendable leg as claimed in claim 1, wherein the first, intermediate and final members are telescopically interconnected.

8. An extendable leg as claimed in claim 7, wherein the first member is an innermost one of the first, intermediate and final members and the final member is an outermost one of the first, intermediate and final members.

* * * * *